US005188073A

United States Patent [19]

Ejiri et al.

[11] Patent Number: 5,188,073

[45] Date of Patent: Feb. 23, 1993

[54] FLUID CONTROL VALVE, VALVE SUPPORT MEMBER THEREFOR AND IDLING AIR AMOUNT CONTROL APPARATUS FOR AUTOMOBILE USING THE FLUID CONTROL VALVE

[75] Inventors: Yuki Ejiri, Katsuta; Tsutomu Okazaki, Ryugasaki; Koichiro Yamada, Mito; Chiaki Niida, Katsuta, all of Japan; Hiroaki Saeki, West Bloom Field, Mich.; Hideki Honma, Katsuta, Japan

[73] Assignees: Hitachi Ltd., Tokyo; Hitachi Automotive Engineering Co., Ltd., Ibaraki, both of Japan

[21] Appl. No.: 909,682

[22] Filed: Jul. 7, 1992

Related U.S. Application Data

[63] Continuation of Ser. No. 680,744, Apr. 5, 1991, abandoned.

[30] Foreign Application Priority Data

Apr. 6, 1990 [JP] Japan .................................. 2-90349

[51] Int. Cl.[5] ...................... F02D 41/16; F16K 31/02; F16K 41/00

[52] U.S. Cl. .............................. 123/339; 251/129.15; 251/214; 251/318

[58] Field of Search ............... 123/327, 339, 585, 568, 123/569; 251/129.05, 129.07, 129.09, 129.10, 129.11, 129.15, 129.16, 214, 318, 331

[56] References Cited

U.S. PATENT DOCUMENTS 4,360,161 11/1982 Claxton et al. ...................... 239/463
4,378,766 4/1983 Yamazoe et al. ............. 251/129.05
4,383,546 5/1983 Walters, Jr. .................... 251/214 X
4,480,614 11/1984 Kobashi et al. .................... 123/339
4,593,881 6/1986 Yoshino .......................... 251/129.11
4,617,889 10/1986 Nishimiya et al. ............ 123/585 X
4,725,040 2/1988 Fornuto et al. ................ 251/214 X
4,813,647 3/1989 Yagi et al. ...................... 251/129.05
4,823,750 4/1989 Niida et al. ......................... 123/339

FOREIGN PATENT DOCUMENTS 229315 7/1987 European Pat. Off. .
3410993 9/1985 Fed. Rep. of Germany .
94079 7/1981 Japan .
24133 1/1989 Japan .
1563500 3/1980 United Kingdom .

*Primary Examiner*—Willis R. Wolfe
*Attorney, Agent, or Firm*—Antonelli, Terry, Stout & Kraus

[57] ABSTRACT

A fluid control valve which regulates a flow rate of a liquid and, more particularly, which controls a fluid by axially moving a valve body fixed to a valve shaft. The fluid control valve comprises a device for absorbing vibrations of the valve shaft in a direction perpendicular to the axis thereof. More specifically, there is provided a device for exerting a pressing force to lightly press the valve shaft against the inner walls of bearings. Alternatively, the valve shaft may be held between a plurality of elastic plates fixed on the inner surface of a valve casing. A support member for such a valve shaft used in the fluid control valve comprises a disk having a center hole through which the valve shaft is inserted, an annular member formed around the disk, and an elastic piece one end of which is secured to the disk or the annular member, while the other end of the elastic piece is extended to the vicinity of the center of the hole, so that the annular member is fixed on the inner surface of the valve casing, and that the distal end of the elastic piece is pressed against the valve shaft which is extended through the hole. According to the invention, vibrations of the center shaft in radial directions can be suppressed to prevent unstable movements of the valve.

18 Claims, 4 Drawing Sheets

FLUID CONTROL VALVE, VALVE SUPPORT MEMBER THEREFOR AND IDLING AIR AMOUNT CONTROL APPARATUS FOR AUTOMOBILE USING THE FLUID CONTROL VALVE

This is a continuation of application Ser. No. 680,744 filed Apr. 5, 1991, now abandoned.

FIELDS OF THE INVENTION

This invention relates to a valve which regulates a flow rate of a liquid and, more particularly, to a fluid control valve a fluid by axially moving a valve body fixed to a valve shaft.

BACKGROUND OF THE INVENTION

Fluid control valve is disclosed in Japanese Patent Unexamined Publication No. 56-94079, a fuel injection valve for an automobile disclosed in U.S. Pat. No. 4,360,161 or the like, and an idling air amount control valve for an automobile in disclosed in Japanese Patent Unexamined Publication No. 64-24133 with each being designed in such a manner that a rod-like valve shaft provided with a valve body is axially moved by driving means, e.g., an electromagnetic solenoid, so as to open/-close the valve to thereby control a flow rate of a fluid.

In these conventional examples, no consideration is given to the fact that slight gaps between the valve shaft and bearing means induce vibration and inclination of the valve shaft in a direction perpendicular to the shaft. Consequently a number of problems arise namely, the flow rate characteristics of the fluid cannot be reproduced and reliability of the valve operation will not be satisfactorily obtained. Furthermore, the valve shaft is imbolized when the gaps between the valve shaft and the bearings are clogged by particles generated as a result of wear of the valve shaft; additional wear particles adhere to or accumulate on a valve seat or the surface of the valve body so as to interfere with complete closing of a valve opening.

SUMMARY OF THE INVENTION

It is an object of the present invention to solve the above-described problems of the conventional examples by preventing vibration and inclination of the rod-like valve shaft.

In the fluid control valve disclosed in Japanese Patent Unexamined Publication No. 56-94079, the valve shaft is supported by a leaf spring and arranged so as to axially move as it is. Since the valve shaft is secured to the leaf spring, the portion where the leaf spring and the valve shaft are secured together may being displaced along an arcuate track during the movement of the valve shaft, and therefore, the valve shaft cannot move straight along its axial line. As a result, the axial line of the valve is displaced from the center of the valve, thereby providing an unstable the flow rate control characteristic.

According to the present invention, the above object is achieved by providing means for absorbing vibrations of a valve shaft in a direction perpendicular to its axis.

More specifically, there are provided means for exerting a pressing force to lightly press the valve shaft against the inner walls of bearings.

Alternatively, the valve shaft may be held between a plurality of elastic plates fixed on the inner surface of a valve casing.

It should be noted that it is necessary to limit the magnitude of the pressing or holding force so that it will not interfere with advancing/retreating movement of the valve shaft in its axial direction.

A support member for such a valve shaft used in a fluid control valve comprises a disk having a center hole through which the valve shaft is inserted, an annular member formed around the disk, and an elastic piece one end of which is secured to the disk or the annular member, while the other end of the elastic piece is extended to the vicinity of the center of the hole, so that the annular member is fixed on the inner surface of the valve casing, and that the distal end of the elastic piece is pressed against the valve shaft which is extended through the hole.

Alternatively, a plurality of the elastic pieces may be provided for holding the valve shaft.

In the fluid control valve having the above-described structure, the valve shaft moves axially while it is lightly pressed against the inner walls of the bearings, and consequently, the valve shaft will not be vibrated in the direction perpendicular to its axis.

Further, the valve shaft is supported by the elastic piece in the direction perpendicular to its axis. Therefore, even when the valve shaft is to be displaced in the direction perpendicular to its axis, the elastic piece absorbs the displacement. As a result, the valve shaft will not be easily displaced in that direction, and the valve shaft will not be vibrated nor inclined.

Thus, a fluid control valve free from the above-described problems and having a stable characteristic of flow rate control is realized.

When this fluid control valve is applied to a fuel injection valve for an automobile, it is possible to constantly measure the fuel, and the dynamic range is widened so as to improve the controllability at the time of fuel supply of a small amount.

Moreover, when this fluid control valve is applied to an idling air amount control valve for an automobile, it is possible to accurately control an amount of bypass air at the time of idle rotation of an engine, thereby preventing the engine from stalling due to insufficiency of the air amount and from abruptly occurring excessive running due to excessiveness of the air amount.

Control valves of this type applied to fluid control for an automobile are particularly subject to unfavorable influence of vibration of the engine. However, deterioration of the flow rate characteristic caused by the engine vibration can be prevented by using the control valve according to the present invention.

The support member has a simple structure comprising the disk, the annular member and the elastic piece fixed on them, and the support member also improves efficiency of assembling operation because it can be assembled in place merely by closely fitting the annular member into the inner wall of the valve casing at the time of assembling the control valve.

DETAILED DESCRIPTION

The present invention will be described in detail hereinafter on the basis of embodiments in which the invention is applied to a control valve for regulating an amount of air for idling an automobile engine.

Figure 1:
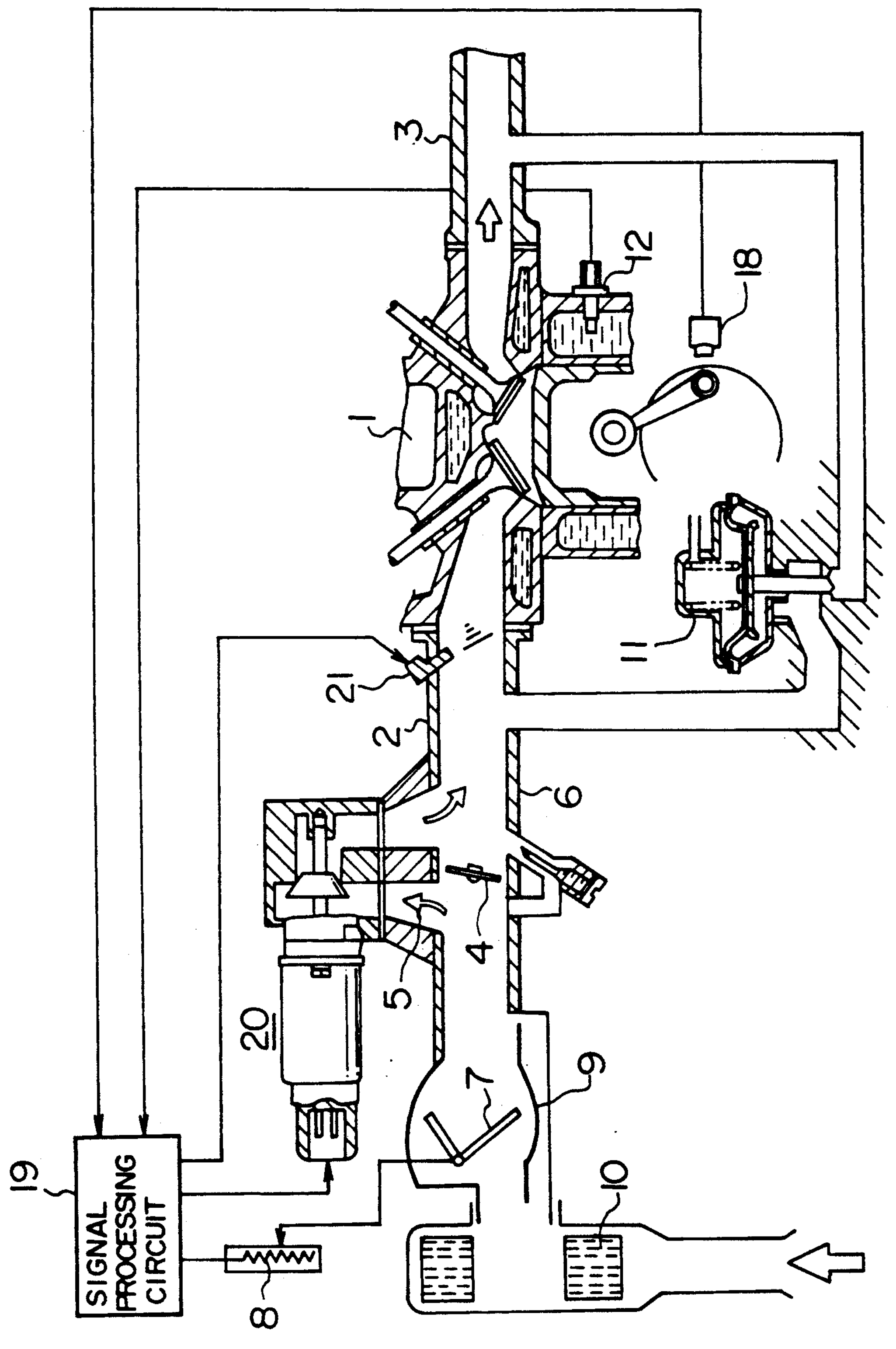
FIG. 1 is a diagram of a system to which the control valve of the present invention is applied.

Referring to FIG. 1, an engine 1 is provided with a suction pipe 2 and an exhaust pipe 3, with the suction pipe 2 including a throttle valve chamber 6 including a throttle valve 4 and a bypass line (passage) 5. On the upstream side of the suction pipe 2 there is provided an air flowmeter 9 which comprises a vane 7 for measuring an amount of air and a potentiometer 8 for converting an angle of rotation of this vane 7 into an electric output signal. An air cleaner 10 is installed upstream of the vane. An EGR valve (Exhaust Gas Recirculating valve) 11 is provided on a conduit connecting the suction pipe 2 and the exhaust pipe 3 so as to return a part of the exhaust to the suction system.

A water temperature sensor 12 detects a temperature of cooling water in the engine 1 and converts the detached temperature into an electric output signal. A crank angle sensor which detects a rotational speed of the engine 1 and converts the rotational speed into an electric output signal. An arithmetic processing circuit (computer) 19 receives and processes various input signals so as to supply certain outputs to the idle running control apparatus 20 and a fuel injection valve 21. This arithmetic processing circuit 19 functions as a central unit of electronic control of the engine, which supplies inputs to the apparatus according to the invention as well.

The idle running control apparatus 15 is provided on the bypass line 5 of the throttle valve chamber 6 so as to control an amount of air bypassing the throttle valve 4.

Figure 2:
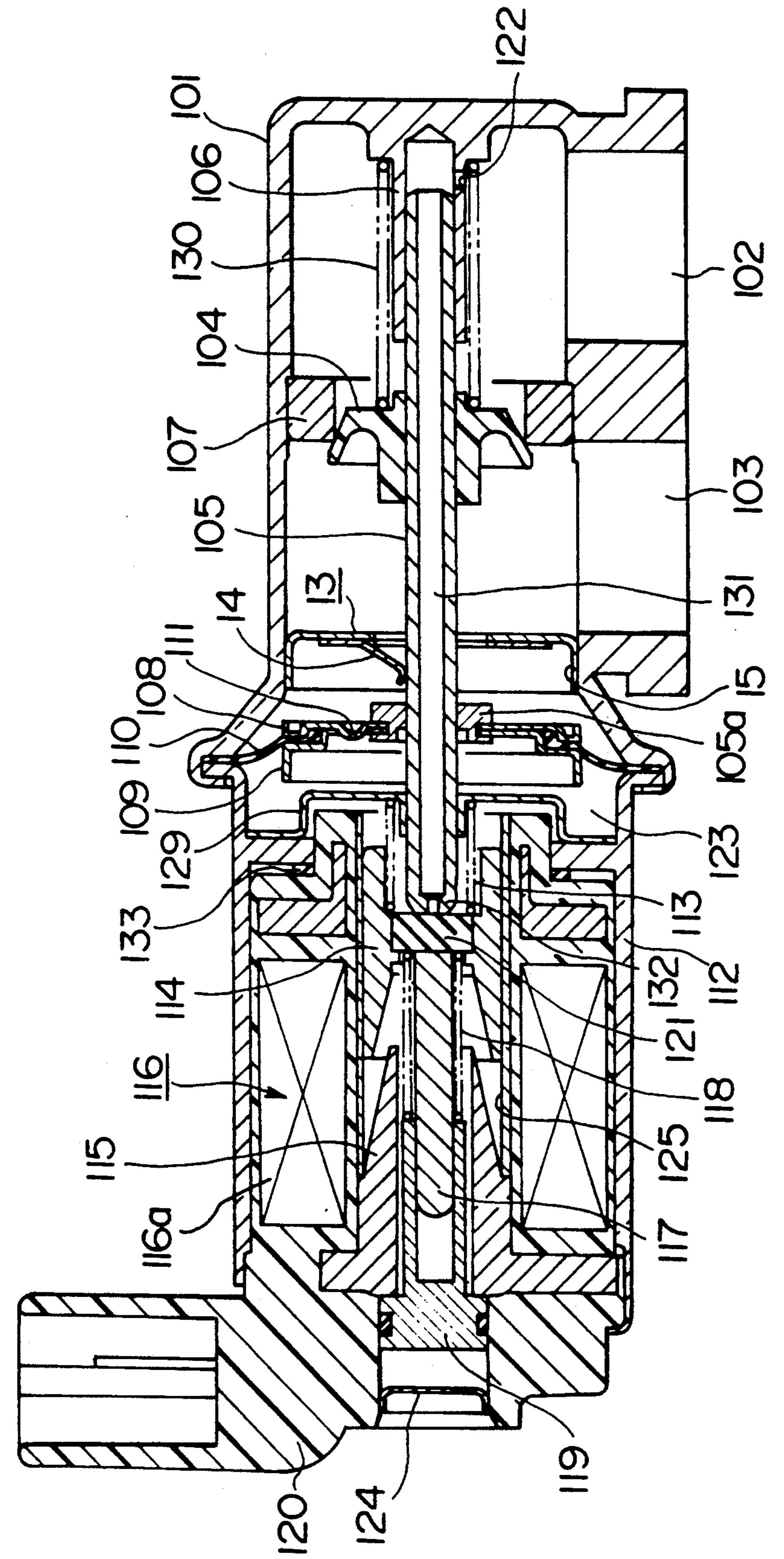
FIG. 2 is a cross-sectional view of a control valve according to one embodiment of the present invention.

Referring to FIG. 2, there will now be described a first embodiment of an air amount control valve for use in the idle running control apparatus to which the present invention is applied.

A conduit 102 of a valve casing 101 communicates with the downstream side of the throttle valve, and a conduit 103 communicates with the upstream side of the throttle valve. A center shaft 105, provided at the center portion of a valve 104, is axially movably supported by a bearing 106 fixed on the valve casing 101. When the valve 104 is in contact with a seat 107, fixed on the valve casing 101, a gap between the conduits 102 and 103 can be completely closed. A caulking member 105*a* is fastened on the center shaft 105 so as to fix plates 108 and 109. An inner ring portion of a diaphragm 110 is held between the plates 108 and 109. The plates 108 and 109 are provided with an orifice 111 in communication with the conduit 103. An outer ring portion of the diaphragm 110 is held between the valve casing 101 and a solenoid casing 112. A bearing plate 129, secured on the casing 112, includes a cylindrical portion at the center which receives the shaft 105 passing therethrough. A solenoid assembly 116 is fixedly contained in the solenoid casing 112. The solenoid assembly 116 comprises a plunger 114 movable in the same direction as the center shaft 105, a solenoid core 115 which attracts the plunger 114, an annular coil 116*a* surrounding the plunger 114 and the core 115, a shaft 117 fixed on the plunger 114, a spring 118 pressing the plunger 114 toward the valve 104, and an adjust screw 119 preset loading of the spring 118 and supporting the shaft 117 in a bearing hole at the center. All these components are entirely molded of a molded resin material 120. A valve body 121 made of rubber is installed in the plunger 114. Further, a spring 113 is provided between the bearing plate 129 and the plunger 114 so as to press the plunger 114 toward the adjust screw 119.

The solenoid in this arrangement is a linear solenoid whose movable part moves in a linear characteristic in response to a current. As the current is increased, the plunger 114 is moved toward the core 115, and the valve body 121 is moved along with the plunger 114, so that the valve body 121 is moved away from a terminal end of the center shaft 105. Then, a negative pressure in the conduit 102 passes through a bore 122, a conduit 131 within the center shaft 105, and an orifice 132 at the distal end of this shaft, and is introduced into a chamber 123 between the diaphragm 110 and the solenoid casing 112. Although part of the negative pressure leaks through the orifice 111, most of the negative pressure is introduced into the chamber 123 so as to make the pressure in this chamber lower than that in the conduit 103. Due to the difference between the pressure in the chamber 123 and that in the conduit 103, the diaphragm 110 is drawn toward the left of the drawing, and thus, the valve 104 is opened by the shaft 105. With the negative pressure which has leaked through the orifice 111 and the negative pressure which has been introduced via the valve 104 being in equilibrium, the center shaft 105 is moved in such a manner that the orifice 132 at the distal end of the shaft 105 is closely fitted to the valve body 121 of the plunger 114. When the orifice 132 is closed, the pressures tend to balance through the orifice 111. At that balancing, the diaphragm 110 is displaced toward the right of the drawing, and the orifice 132 is then opened to introduce the negative pressure in the conduit 102 into the chamber 123 again, displacing the diaphragm 110 toward the left of the drawing. Thus, the valve 104 is moved to a position corresponding to the displacement of the plunger 114 and retained in that position.

The springs 113, 118 and 130 serve to prevent the valve 104 and the valve body 121 (i.e., the plunger 114) from being displaced due to the vibration or oscillation. The adjust screw 119, provided at the rear end of the solenoid, serves to adjust non-uniformity of the load of the spring 118 as a result of errors in production and assembling.

In this apparatus, the valve 104 is completely closed not only when there is no power supply but also when the diaphragm 110 is broken. Even when the orifice 111 is clogged, the valve 104 will not be opened so long as the valve body 121 is closed. In this manner, there can be obtained an effect that the valve 104 is closed even upon malfunctioning of the component parts.

The significant point to note here is that, although the center shaft 105 is supported by the bearing 106 and the bearing plate 129 and axially pressed by the spring 113, 118, 130, it is not enough to suppress vibrations of the valve 104 and the center shaft 105 in radial directions.

Figure 3:
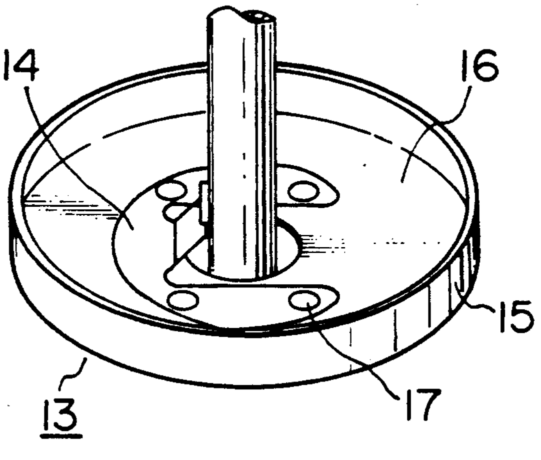
FIG. 3 is a perspective view of a vibration suppressing member shown in FIG. 2.

In this embodiment, therefore, a vibration suppressing member shown in FIG. 3 is provided on the inner periphery of the valve casing 101. The vibration suppressing member 13 is made of a thin metal plate and shaped like a cup. An opening through which the center shaft 105 is extended is formed at the center of a disk portion 16 of the vibration suppressing member 13. Further, a leaf spring 14 is secured on the disk portion 16 by rivets 17. The leaf spring 14 is arranged to be contacted with the outer surface of the center shaft 105 with a predetermined force when the center shaft 105 is extended through the opening.

The cup-like vibration suppressing member 13 having the above structure is fixed in the valve casing 101 when an outer peripheral annular portion 15 of the former is closely fitted into an inner peripheral annular portion of the latter.

Next, assembling of the control vale will be described.

The solenoid assembly 116 is placed at the inside of the solenoid casing 112 with a seal ring 133 being interposed therebetween. The distal end of the casing 112 is caulked and secured to the molded resin surface of the solenoid assembly 116.

The valve body 121, made of rubber, is molded on the distal end of the shaft 117 and press-fitted in a center hole of the plunger 114 so as to secure both these members to the plunger 114.

The spring 118 is provided around the shaft 117 of the plunger assembly, and while this shaft 117 is inserted into the bearing hole of the adjust screw 119, the plunger 114 is loosely fitted into a center hole of the solenoid **116*a***.

The spring 113 is then set in the center hole of the plunger 114, and the bearing plate 129 is fixed on the end face of the solenoid **116*a* so as to receive one end of the spring 113. At this stage, the plunger 114 is located at a position where pressing forces of the springs 113 and 118** are balanced.

Meanwhile, a caulking **105*a* is fixed to the center shaft 105, and then, the plate 108, the diaphragm 110 and the plate 109 are set in this order to the caulking 105*a* from the left of FIG. 2, so as to fix these three members by folding the left end of the caulking 105*a* outwardly. Then, the vibration suppressing member 13 is provided on the center shaft 105, and thereafter the valve 104 is molded and fixed at a predetermined position of the center shaft 105. The center shaft assembly thus obtained is fixed with its end on the side of the valve 104 being inserted into a hole of the bearing 106 around which the spring 130 is provided, while the outer peripheral cylindrical portion of the vibration suppressing member 13 is press fitted in the inner peripheral surface of the valve casing 101**.

The outer peripheral edge of the diaphragm 110 is held on a flat portion formed on the peripheral end face of an opening of the valve casing 101, and at the same time, the end of the center shaft 105, on the side of the diaphragm 110, is inserted through the bearing hole of the bearing plate 129 into the center hole of the plunger 114. While the distal end of the shaft 105 is contacted with the end face of the valve body 121, the peripheral end face of the solenoid casing 112 on the side of the opening is superposed on the peripheral edge of the diaphragm 110. In this state, the peripheral edge of the end portion of the valve casing 101 is folded inwardly and caulked onto the peripheral edge of the end portion of the solenoid casing 112, thereby fixing both the solenoid casing 112 and the valve casing 101 in this region while holding the interposed diaphragm 110 therebetween.

In this condition, the spring 118 urges the center shaft 105 toward the right of the drawing with a certain force, against forces of the springs 113 and 130, thus pressing the valve 104 against the seat 107 with a certain force.

Moreover, the leaf spring 14 exerts a pressing force, i.e., a lateral force onto the center shaft 105 in a direction perpendicular to the shaft. As a result, with the predetermined lateral force, the center shaft 105 is pressed to the cylindrical portion of the bearing plate 129 which forms a bearing and to the inner peripheral surface of the bearing hole of the bearing 106. Thus, the center shaft 105 will be affected by vibration transmitted from an engine not as an independent component having a certain mass but as a part of the valve assembly and the solenoid assembly, and, consequently, the center shaft assembly will not be vibrated independently.

If the forces of the springs 118 and 130 are too small, the lateral force interfaces with the axial displacement of the center shaft assembly. Therefore, it is necessary to use springs strong enough to prevent such a situation. The force of each spring must be determined to have a proper value in accordance with the magnitude of the lateral force. However, when the force of the spring 118 is increased, it will be also necessary to increase the electromagnetic force to attract the plunger 114. Taking the electromagnetic force into account as well, the force of such a spring must be accordingly determined.

As shown in FIG. 2, a molded resin material, 120 accommodates a connecting terminal connected with an outside electrical source terminal so as to supply electric power to the solenoid **116*a*. A blind plug closes an opening of a screw hold after the adjust screw 119** is set therein.

A layer 125 is formed on the inner peripheral surface of a bobbin around which a coil of the solenoid **116*a* is wound, and the surface of this layer 125 has a low coefficient of friction. The layer 125 is formed of a non-magnetic product, a thin metal or resin pipe or a coating layer of a solid lubricating material such as molybdenum disulfide or the like, serving to smoothen the axial movement of the plunger 114**.

Referring to FIG. 3, although the leaf spring 14 is fastened on the disk portion 16 by the rivets 17, fastening may be performed by spot welding instead of the rivets 17.

Figure 4:
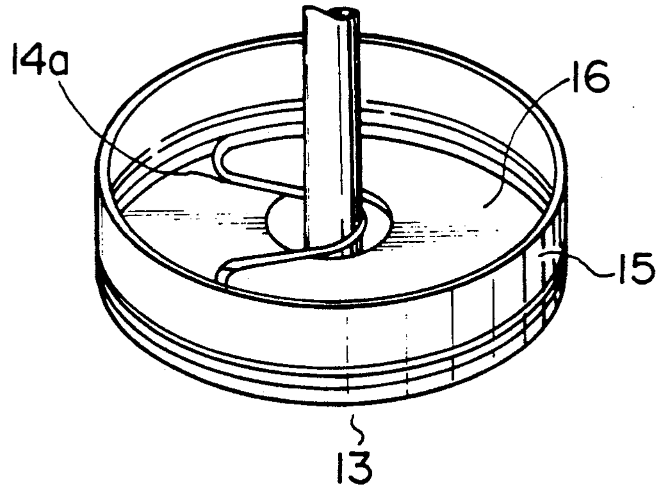
FIG. 4 is a perspective view of another embodiment of a vibration suppressing member.

FIG. 4 illustrates a modification in which a linear spring **14*a* is employed. The spring 14*a* consists of a curved portion which engages with the center shaft 105** and a coil spring portion which is retained in a peripheral edge portion of the bottom surface of the cup-like member due to the resilient force. The coil spring portion is contracted inwardly and placed in the cup-like member so that it will be retained in the inner periphery of the cup-like member due to the resilient force when it is freed from contraction.

Figure 5:
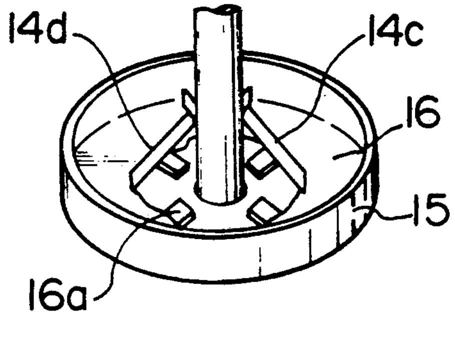
FIG. 5 is a perspective view of a still other embodiment of a vibration suppressing member.

FIG. 5 illustrates another modification in which a member having two symmetrically formed leaf springs **14*c* and 14*d* is held by cut claws 16*a* formed on the disk portion 16 and secured to it by caulking the cut claws 16*a***.

Figure 6:
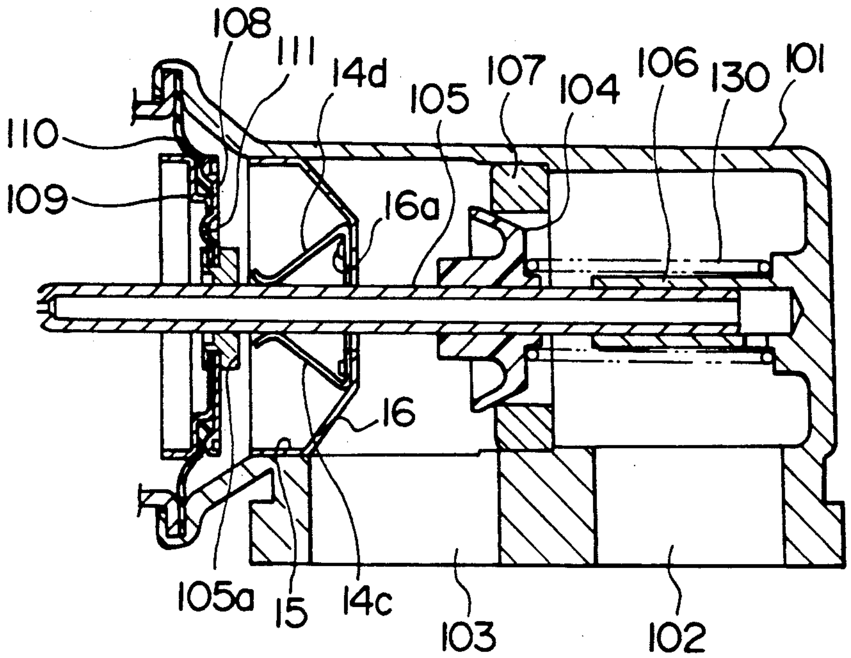
FIG. 6 is a cross-sectional view of a portion of the control valve provided with the vibration suppressing member shown in FIG. 5.

FIG. 6 shows the vibration suppressing member including the two leaf springs **14*c* and 14*d* when it is attached to the valve casing 101**.

In this embodiment, the center shaft 105 is supported as held between the two leaf springs 14*c* and, 14*d*, and consequently, the center shaft 105 is not pressed against the bearing 106 or the bearing plate so as to smoothen the axial movement of the shaft 105.

Figure 7:
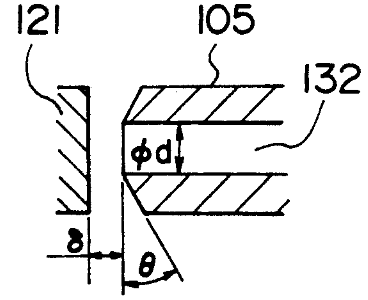
FIG. 7 is an enlarged cross-sectional view showing an improved structure of an orifice portion of the control valve.
Figure 8:
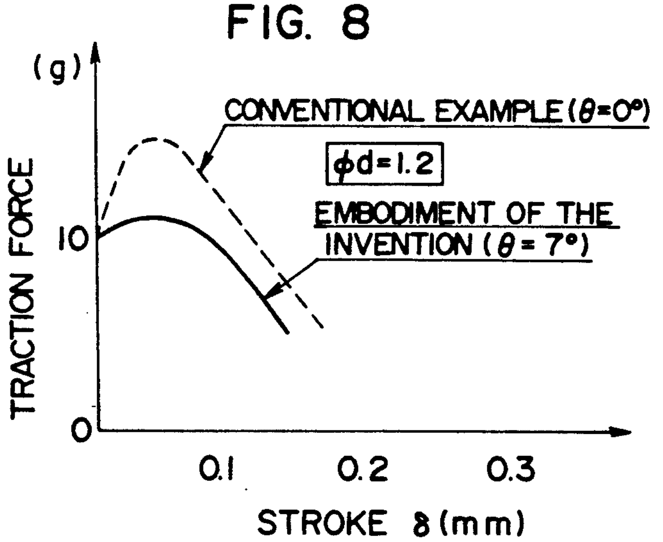
FIG. 8 is a graph illustrative of an effect produced by the improved orifice structure shown in FIG. 7.

An improvement in the configurations of the distal end portion of the center shaft 105 and the orifice 132 formed therein will now be described with reference to FIGS. 7 and 8.

In this embodiment, the distal end of the center shaft 105 is conically shaped to be brought not into plane-contact but into line-contact with the valve body 121.

More specifically, the orifice 132 is designed to have a diameter of 1.2 mm, and the conical surface of the distal end of the shaft 105 is arranged to have an inclination angle $\theta$ of 7° so that the valve body 121 and the orifice portion will be in contact substantially through a circular line.

The traction force of this embodiment is compared with that of a conventional example of plane-contact, results of the comparison being shown in FIG. 9. In the conventional example, as the stroke is enlarged, the traction force between the valve body 121 and the center shaft 105 is increased about 30% (about 3 g) at one stage. On the other hand, the traction force in this embodiment is not increased but decreased rapidly.

Conventionally, the traction force is so large that it is necessary to largely displace the diaphragm 110 in order to separate the valve body 121 and the distal end of the center shaft 105. Therefore, the distance between these two members thus separated becomes too long, accordingly displacing the valve 104 to an unnecessary extent, resulting in an overshoot phenomenon of control of the air flow rate.

In this embodiment according to the invention, the traction force between the two members can be made remarkably small so as to prevent the overshoot phenomenon.

As a result, there can be achieved a technique of application of the lateral force in which, when the lateral force is exerted on the center shaft 105, its axial movement will not be unstable.

By virtue of the above-noted features of the present invention, vibrations of the center shaft in radial directions can be suppressed thereby preventing unstable movements of the valve.

What is claimed is:

1. An apparatus for controlling an amount of idling air of an automobile comprising an idle running speed control valve of an internal combustion engine, said control valve being located in a bypass passage which connects the upstream side and the downstream side of a suction throttle valve provided in a suction conduit of the internal combustion engine, said control valve supporting a rod-like valve shaft provided with a valve body in such a manner that said valve shaft can be moved in its axial direction, and displacing the valve body in the axial direction in accordance with an amount of power supply to a solenoid so as to change an area of said bypass passage and control an amount of air flowing through said bypass passage, said apparatus further including pressing means which press said shaft provided with the valve body in a direction perpendicular to the shaft to such an extent that displacement of said valve body is not interfere with.

2. A fluid control valve comprising: a valve opening provided between an inlet and an outlet of a fluid conduit; a valve body provided opposite to said valve opening; a shaft which displaces said valve body; bearings which support both ends of said shaft axially movably; an electromagnet device which exerts an axial force on a plunger; a coil spring which presses said valve body in such a direction as to close said valve opening; and spring means which are different from said coil spring and generate forces to press said shaft against the inner walls of said bearings.

3. An apparatus for controlling an amount of idling air of an automobile comprising an idle running speed control valve of an internal combustion engine, said control valve being located in a bypass passage which connects the upstream side and the downstream side of the suction throttle valve provided in a suction conduit of the internal combustion engine, said control valve supporting rod-like valve shaft means provided with a valve body in such a manner that said valve shaft means can be moved, wherein the valve body is displaced in dependence upon an amount of power supplied to a coil so as to change an area of said bypass passage to control the amount of air flowing through said bypass passage, said apparatus further including pressing means for pressing said shaft means provided with the valve body in a direction perpendicular to the shaft means to such an extent that displacement of said valve body is not interfered with.

4. A fluid control valve comprising: a valve opening provided between an inlet and outlet of a fluid conduit; a valve body provided opposite to said valve opening; shaft means for displacing said valve body; supporting means for movably supporting said shaft means; an electromagnetic device for exerting a force to open said valve; and spring means for generating forces to press said shaft means against inner walls of said supporting member.

5. A fluid control valve comprising: a valve disposed in a course of a fluid passage; a shaft fixed to a valve body of said valve so as to axially move said valve; a driving power source to supply an advancing force to said shaft; bearing means which support said shaft but allow it to axially move freely; and shaft biasing means which exert at least a pressing force on said shaft in a direction perpendicular to the shaft and press said shaft against the inner walls of said bearing means with a predetermined force.

6. A fluid control valve according to claim 5, wherein said driving power source is a generating device of a magnetic traction force using an electromagnetic solenoid, said shaft including a member to be attracted by the magnetic traction force.

7. A support member for a fluid control valve comprising: a disk including a center hole through which a valve shaft is inserted; an annular attaching member formed around said disk so as to attach said disk in a casing of a valve; and an elastic piece fastened on one of said disk and said annular attaching member and extending toward the center of said hole so as to exert at least a pressing force on the valve shaft extending through said hole in a direction perpendicular to said shaft.

8. A fluid control valve according to claim 7 further comprising: vibration suppressing means for preventing vibrations of a valve shaft.

9. A fluid control valve according to claim 7, further including vibration suppressing means which consist of at least two elastic members fastened on the inner wall of a valve casing, said valve shaft being slidably held between distal-end curved portions of said elastic members.

10. A fluid control valve comprising a valve disposed in a course of a fluid passage; shaft means fixed to a valve body of said valve; a driving power source for supplying a force to open said valve; supporting means for supporting said shaft means; and biasing means for exerting at least a pressing force on said shaft means in a direction perpendicular to the shaft means and pressing said shaft means against inner walls of said supporting means with a predetermined force.

11. A fluid control valve according to claim 10, wherein said driving power source is a generating device of a magnetic traction force using an electromagnetic coil, said shaft means including a member to be attracted by the magnetic traction force.

12. A fluid control valve according to claim 10, wherein said shaft means includes a shaft fixed to the supporting member and hollow shaft fitted on said shaft.

13. An apparatus for controlling an amount of idling air of an automobile comprising: a plunger provided in an air conduit bypassing a suction pipe and positioned in accordance with a signal which is input to a solenoid; a hollow shaft; and a valve and a diaphragm which are provided on said shaft, so that one end of said shaft is opened at the downstream side of said valve, and that the other end of said shaft, which is opened in a negative pressure chamber defined by said diaphragm, functions as a valve mechanism with a seat provided on said plunger, said idle running control apparatus further including a spring mechanism which exerts at least a force on said shaft in a radial direction.

14. An apparatus for controlling an amount of idling air of an automobile according to claim 13, wherein said spring mechanism comprises two springs or more which generate forces in radial directions which are opposed to each other with respect to said shaft.

15. An apparatus for controlling an amount of idling air of an automobile according to claim 13, wherein said spring mechanism is at least a linear spring.

16. An apparatus for controlling an amount of idling air of an automobile according to claim 13, wherein said spring mechanism is at least a leaf spring.

17. An apparatus for controlling an amount of idling air of an automobile according to claim 16, wherein said spring mechanism is fastened by spot welding.

18. An apparatus for controlling an amount of idling air of an automobile according to claim 16, wherein said spring mechanism is fastened by bending at least a plastic fastener member.

* * * * *